(12) United States Patent
Xiao et al.

(10) Patent No.: US 10,989,264 B2
(45) Date of Patent: Apr. 27, 2021

(54) METHODS FOR MAKING A BRAKE PAD RETENTION PLATE

(71) Applicant: Commercial Vehicle Components, LLC, Delray Beach, FL (US)

(72) Inventors: Guipu Xiao, Shanghai (CN); Ebo Mao, Shanghai (CN); Christopher Janech, Clover, SC (US); Jeffrey Geist, Brighton, MI (US)

(73) Assignee: COMMERCIAL VEHICLE COMPONENTS, LLC, Delray Beach, FL (US)

( * ) Notice: Subject to any disclaimer, the term of this patent is extended or adjusted under 35 U.S.C. 154(b) by 0 days.

(21) Appl. No.: 16/982,136

(22) PCT Filed: Mar. 22, 2019

(86) PCT No.: PCT/US2019/023577
§ 371 (c)(1),
(2) Date: Sep. 18, 2020

(87) PCT Pub. No.: WO2019/183473
PCT Pub. Date: Sep. 26, 2019

(65) Prior Publication Data
US 2021/0048082 A1 Feb. 18, 2021

Related U.S. Application Data

(60) Provisional application No. 62/647,243, filed on Mar. 23, 2018.

(51) Int. Cl.
*F16D 69/04* (2006.01)
*B21D 53/88* (2006.01)

(52) U.S. Cl.
CPC ......... *F16D 69/0408* (2013.01); *B21D 53/88* (2013.01); *F16D 2069/0441* (2013.01);
(Continued)

(58) Field of Classification Search
CPC .. F16D 69/0408; F16D 65/092; F16D 65/095; F16D 69/04; F16D 2069/0425;
(Continued)

(56) References Cited

U.S. PATENT DOCUMENTS

| 6,431,331 | B1 * | 8/2002 | Arbesman | B21J 5/068 |
| | | | | 188/250 G |
| 6,464,047 | B1 * | 10/2002 | Arbesman | B21J 5/068 |
| | | | | 188/250 G |

(Continued)

FOREIGN PATENT DOCUMENTS

| EP | 1691103 | 8/2006 |
| KR | 10-2016-0106557 | 9/2016 |

OTHER PUBLICATIONS

Korean Office Action dated Jan. 19, 2021 in connection with a Korean counterpart to the present application.
English Translation of Korean Office Action dated Jan. 19, 2021.

*Primary Examiner* — Pamela Rodriguez
(74) *Attorney, Agent, or Firm* — Patzik, Frank & Samonty Ltd.

(57) ABSTRACT

A method of making a brake pad retention plate and a brake pad retention plate is provided. The method includes upsetting a brake pad facing surface on the retention plate to form a first set of rows having a gutter, or a negative feature such as a depression in the primary plane, in the surface of the retention plate and a tooth feature on a first side of the gutter. The surface of the retention plate is upset to form a second set of rows having a gutter and a tooth feature on the second side of the gutter. The second set of rows being a single row. The second set of rows is placed adjacent to or between first set of rows. A mechanical press is used to deform the tooth to form a base portion and a mezzanine portion extending over a portion of the gutter.

16 Claims, 8 Drawing Sheets

(52) U.S. Cl.
CPC ............ *F16D 2069/0491* (2013.01); *F16D 2200/0008* (2013.01); *F16D 2200/0021* (2013.01); *F16D 2250/0023* (2013.01)

(58) Field of Classification Search
CPC ..... F16D 2069/0441; F16D 2069/0483; F16D 2069/0491; F16D 2200/0008; F16D 2200/0021; F16D 2250/0023; B21D 53/88
See application file for complete search history.

(56) References Cited

U.S. PATENT DOCUMENTS

| | | | |
|---|---|---|---|
| 7,222,701 B2 * | 5/2007 | Pham | B21J 5/068 188/250 G |
| 9,291,225 B2 * | 3/2016 | Arbesman | F16D 65/095 |
| 9,995,356 B2 * | 6/2018 | Pizzio | F16D 65/092 |
| 10,010,923 B1 * | 7/2018 | Arbesman | F16D 69/04 |
| 10,569,494 B2 * | 2/2020 | Arbesman | B32B 3/30 |
| 2006/0180414 A1 * | 8/2006 | Jung | F16D 69/0408 188/250 B |
| 2010/0170758 A1 * | 7/2010 | Chen | B21J 5/068 188/250 G |
| 2016/0281811 A1 | 9/2016 | Pizzio et al. | |

* cited by examiner

METHODS FOR MAKING A BRAKE PAD RETENTION PLATE

CROSS-REFERENCE TO RELATED PATENT APPLICATIONS

The present application claims priority to U.S. Provisional Patent Application Ser. No. 62/647,243, filed Mar. 23, 2018, the disclosure of which is incorporated herein as if set out in full.

BACKGROUND

A disc brake assembly includes, among other things a pair of brake pads arranged on opposing sides of a rotating disc that is coupled to a wheel. The brake pads are coupled to pistons that push the brake pads onto opposing sides of the rotating disc, which functions to brake the wheel, which is typically mounted to a motor vehicle or the like.

The brake pad connection to the piston is subject to a shear force when braking. The shear force tends to cause the brake pad to peel or shear off the backplate. The backplate provides support for the brake pad to provide consistent pad pressures when the brake pad contacts the brake disc/rotor. Without the backplate, the friction would cause cracks from loads not being evenly distributed. A retention plate may have features to resist the shear force on the brake pad to facilitate operation.

The retention plate may take many forms. One conventional retention plate comprises a generally metal plate, such as steel, with metal barbs formed on the surface of the metal plate. The metal barbs are generally formed by using a tool to gouge a surface of the metal plate. The metal barbs may be generally straight or curved. The metal barbs, however, are generally formed in a singular direction or, at most, in rows having alternative directions.

While workable, the retention plates leave much to be desired. Thus, against this background, an improved method of making a brake pad retention plate is provided.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a method of making a brake pad retention plate is provided. The method includes forming a gutter, or a negative feature such as a depression in the primary plane, in the surface of a metal plate. The metal displaced from the gutter forms a generally vertical tooth rising about the gutter. The tooth generally forms an acute angle with the base or floor of the gutter such that the tooth extends over the gutter. A mechanical press is used to deform the tooth to form a mezzanine extending over a portion of the gutter. The gutter has a width and a length. The mezzanine extends over the gutter at or proximal to a central axis dividing the gutter into approximately equal halves. In certain embodiments, the metal plate is formed with a plurality of gutters arranged in a plurality of rows wherein each of the gutters have a first side and second side. The plurality of rows may be grouped as a set of one or more rows of gutters where the rows in each set are formed with the tooth formed on the same side. The gutters are formed, alternating, with a set of rows having the tooth formed on the first side and a set of at least a single row having the tooth formed on the second side.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to disc brakes and retention plates associated with disc brakes. However, the technology described herein may be used for other plates where a composite material is coupled to a metal plate, and the like. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
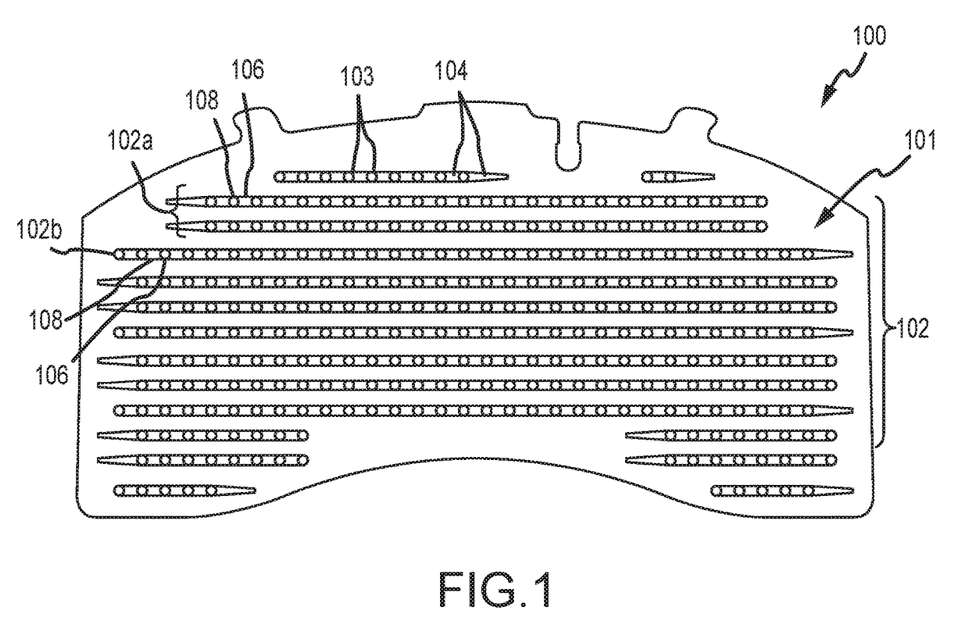
FIG. 1 is a view of a retention plate consistent with the technology of the present application.
Figure 2:
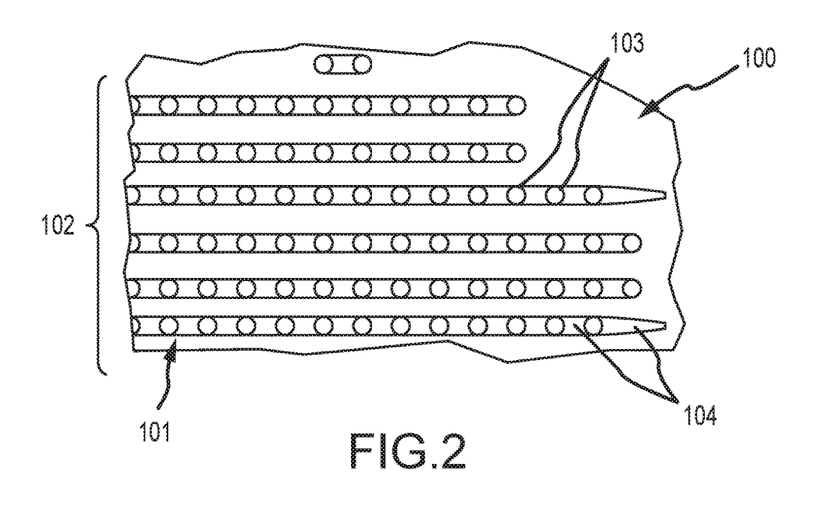
FIG. 2 is a detail of a portion of the retention plate of FIG. 1.

With reference now to FIGS. 1 and 2, a retention plate 100 for a brake pad retention plate (sometime simply retention plate) consistent with the technology of the present application is shown. The retention plate 100 is formed of metal, such as steel or iron. While described with reference to metals, the retention plate 100 may be formed of other materials such as for example, phenolic resins or the like. The retention plate 100 has been formed by the methods described herein. The retention plate 100 comprises a plurality of rows 102 having a plurality of retention features 101. Each of the retention features 101 has a retention protrusion 103 and a gutter 104. The gutter 104 has a first side 106 and a second side 108. Generally, two, three, four, or five rows 102a are formed with a plurality of retention protrusions 103 formed on the first side 106, which may be considered a first set of rows, followed by a single row 102b having a plurality of retention protrusions 103 formed on the second side 108, which may be considered a second set of a row. The single row 102b would be followed by another set of rows 102a formed with the plurality of retention protrusions 103 formed on the first side 106, which may be considered a third set of rows or a second first set of rows, etc.

Figure 3:
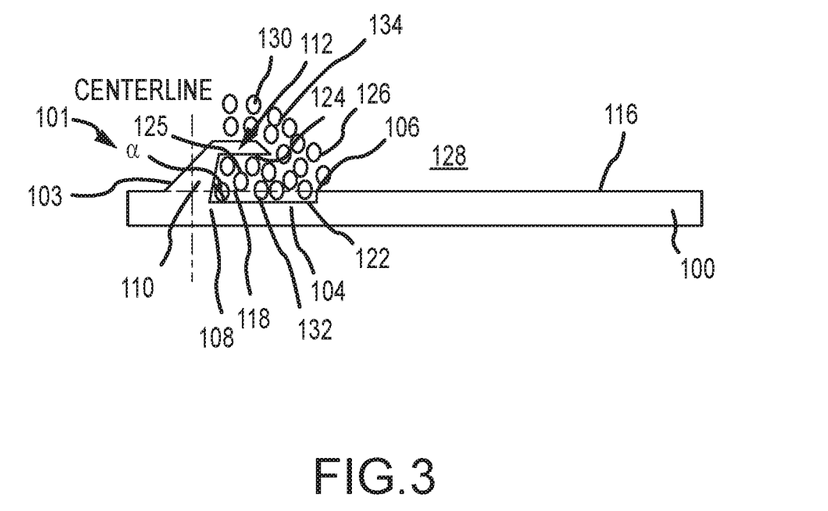
FIG. 3 is a schematic cross-section of a detail of the retention plate of FIG. 1.

A rendition of the retention feature 101 is shown in FIG. 3. The retention feature comprises a retention protrusion 103 and a gutter 104. The retention protrusion 103, whether formed on a first side 106 or a second side 108 as shown, generally includes a vertical base portion 110 and a horizontal mezzanine portion 112, which is formed by pressing a tooth that is formed as explained further below. The horizontal mezzanine portion 112 may be called a mushroom cap.

The retention protrusion 103 is shown in a cross-sectional rendition in FIG. 3. The retention protrusion 103 is formed with the vertical base portion 110 that extends generally vertically above the brake pad facing surface 116 of the retention plate 100. The base portion 110 has a gutter facing surface 118 that is inclined with respect to a gutter 104 such that a floor 122 of the gutter 104 forms an angle a, which is generally acute, with the gutter facing surface 118. The angle a is generally less than 90 degrees and more than 45 degrees although in certain embodiments it may be equal to either (45<a<90). The retention protrusion 103 further includes a mezzanine portion 112 extending generally horizontally above the gutter 104. The mezzanine portion 112 has a generally flat gutter facing surface 124 above the gutter 104. In certain embodiments, the mezzanine portion 112 may extend over as much as about one quarter to one third of the gutter 104 forming a capture chamber 125 and an opening 126. In other words, the length of the mezzanine portion 112 may be up to 25% or 33% of the length of the gutter. Generally, the mezzanine has a length of between about 1.0 mm to 3.0 mm although the average length is typically between about 1.5 mm and 2.5 mm. The opening 126 places the area 128 above the retention plate 100 in fluid communication with the capture chamber 125. The brake pad 130, shown as a rendering of flowable parts in FIG. 3, has a portion 132 (which may be referred to as the captured brake pad 132) in the capture chamber 125 and a remainder portion 134 (which may be referred to as the bulk of the brake pad 134) outside and above the mezzanine portion 112.

As explained above, two, three, four, or five successive rows 102a are formed with a plurality of retention protrusions 103 formed on the first side 106 followed by a single row 102b having a plurality of retention protrusions 103 formed on the second side 108. Providing a single row 102b between every successive third, fourth, or fifth row with the plurality of rows 102a has been found to increase the shear resistance in the X-Y-Z directions of the friction material once coupled to the retention plate.

Figure 4:
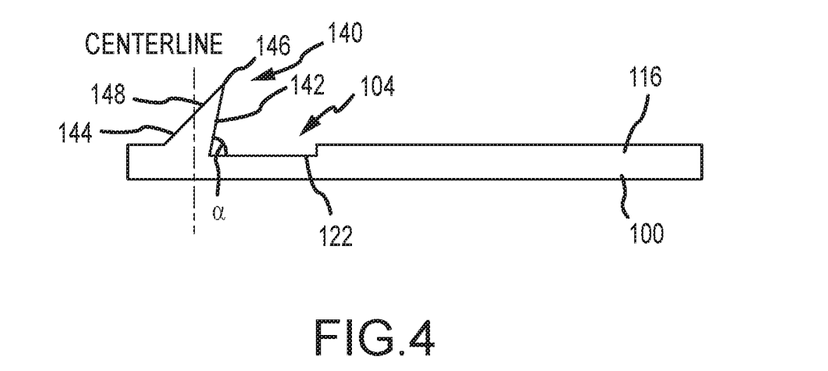
FIG. 4 is a schematic cross-section of a detail of the retention plate of FIG. 1 after upsetting the surface but prior to pressing.

The process to create each of the retention features 100 begins by providing the retention plate 100 with the brake pad facing surface 116 generally flat and unmarred. A process, such as a knifing process, creates the gutter 104 by upsetting the brake pad facing surface 116 of the retention plate 100 to form a tooth feature 140 as shown in FIG. 4. Generally, the gutter 104 has a length of up to approximately 7-7.5 mm. The length of the gutter 104 generally is dependent on the number of retention features desired in any particular row and the overall length of the retention plate. The gutter 104, proximal the tooth feature 140 formed by the knifing process, has a width of 1.5-2.3 mm although the width may range from 0.5-2.5 or 3.0 mm in certain instances. The width of the gutter 104 is dependent, in part, on the tool used to upset or score the surface. The tooth feature 140 is a buildup of material gouged from the retention plate to form the gutter 104. The tooth feature 140 has a vaguely triangular shape because of the procedure with a gutter facing surface 142 and a non-gutter facing surface 144 opposite the gutter facing surface 142. The gutter facing surface 142 and non-gutter facing surface 144 converge to a peak 146, which is typically rounded although shown as a point in the figure. The gutter facing surface 142 forms the angle α with the floor 122 of the gutter 104. In certain embodiments, the buildup of material is controlled such that the peak 146 is at or proximal a central axis dividing the gutter 104 in approximately equal halves.

Subsequent to the plurality of gutters 104 being formed with the plurality of tooth features 140 proximal to the plurality of gutters 104, a press (not shown) is lowered over the retention plate 100. The surface of the press contacts the peak 146 of the tooth feature 140 and applies a force in the downward direction (downward in this instance means a force compressing the tooth feature). The inclination of the overall tooth feature 140 and the inclination of the gutter facing surface 142 results in the force applied by the press causing the tooth feature to bend at an inflection point 148 along surface 144. The tooth 140 generally bends over the gutter 104 at or proximal the central axis, which begins the creation of the capture chamber 125.

The press continues to apply pressure and cause the tooth feature 140 to bend until the mezzanine portion 112 is formed along with the base portion 110. As can be appreciated, the mezzanine portion 112 flattens, and extends, over the gutter 104. As explained above, the mezzanine portion 112 generally extends over a substantial length of the gutter 104 to form the capture chamber 125.

After the mezzanine portion 112 is created, powder friction material is provided by hot pressing to the retention side of the plate. Some of the powder will flow through the opening 126 into the capture chamber 125. The hot press is applied for a sufficient time (at temperature and pressure). The flowable powder forms into a solid piece that couples the retention plate and friction material together by, in part, solidifying the friction material around the retention feature. The formation to a solid material may require use of a curing oven.

Figure 5:
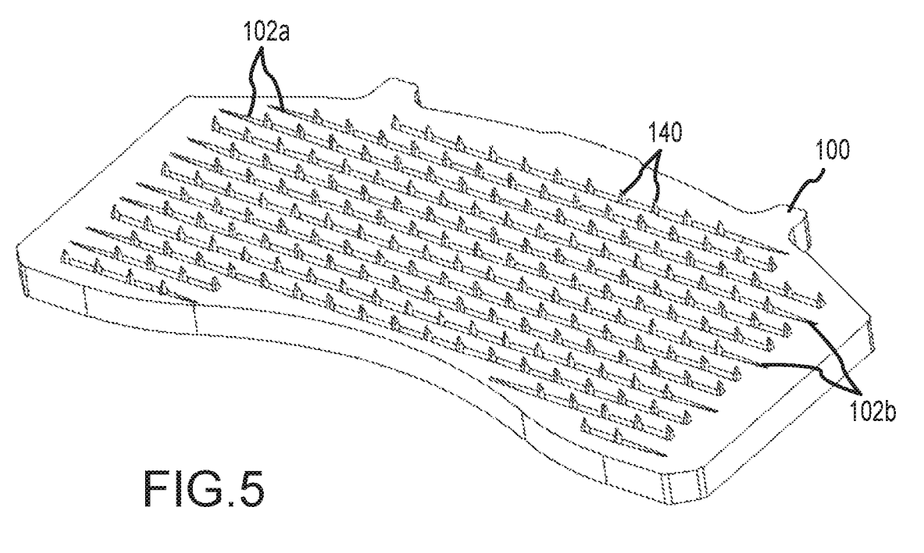
FIG. 5 is an isometric, perspective view of the retention plate of FIG. 1 prior to pressing.
Figure 6:
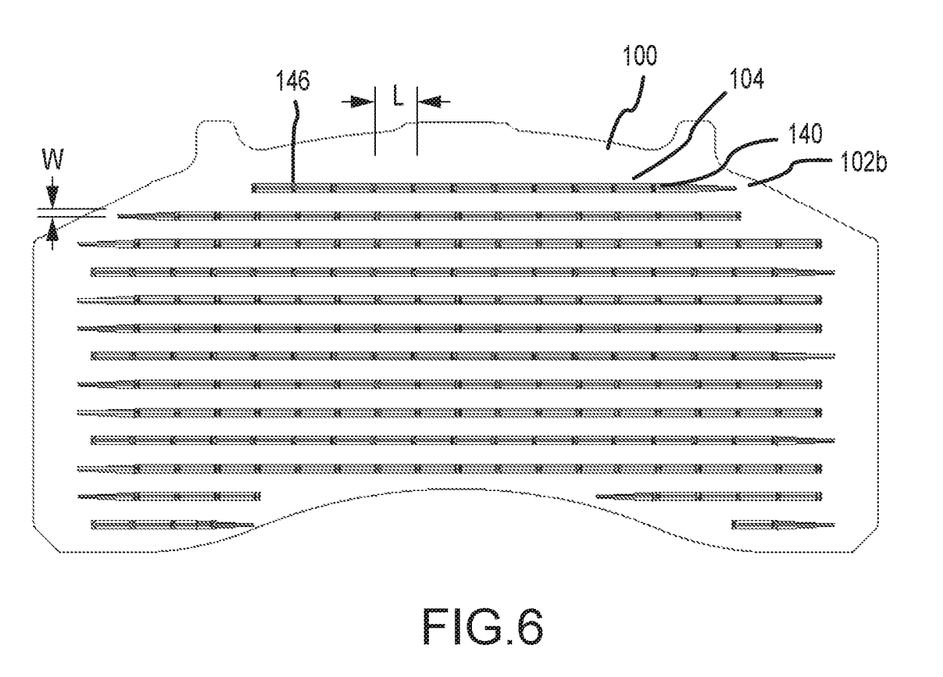
FIG. 6 is an isometric, top view of the retention plate of FIG. 1 prior to pressing.
Figure 7:
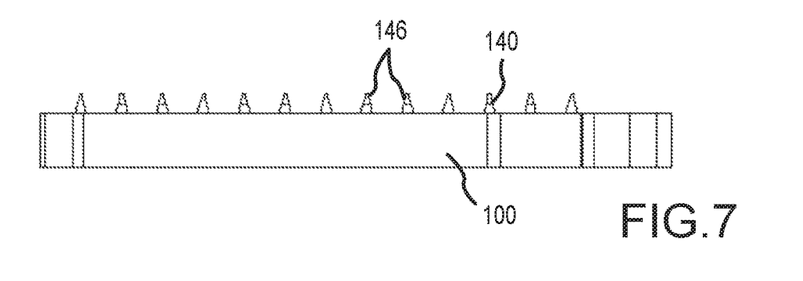
FIG. 7 is an isometric, side view of the retention plate of FIG. 1 prior to pressing.

FIGS. 5, 6, and 7 show views of the retention plate 100 after the retention plate has been gouged to form the gutters 104 and the tooth feature 140, but prior to being pressed. FIG. 5 is a perspective view of the retention plate 100 showing rows 102a and 102b having gutters 104 and tooth features 140. The gutters 104 in rows 102a have the tooth feature 140 formed on the opposite side of the gutters 104 in rows 102b. FIG. 6 shows a top elevation view of the retention plate 100. As can be seen in the FIG. 6, the gutters 104 optimally have a length L and a width W, although the length L and width W is not exact because of the manufacturing process. The peak 146 of the tooth 140 is at or proximal the W/2 point along the width of the gutter 104 as identified above. FIG. 7 is a side elevation view of the retention plate 100

Figure 8:
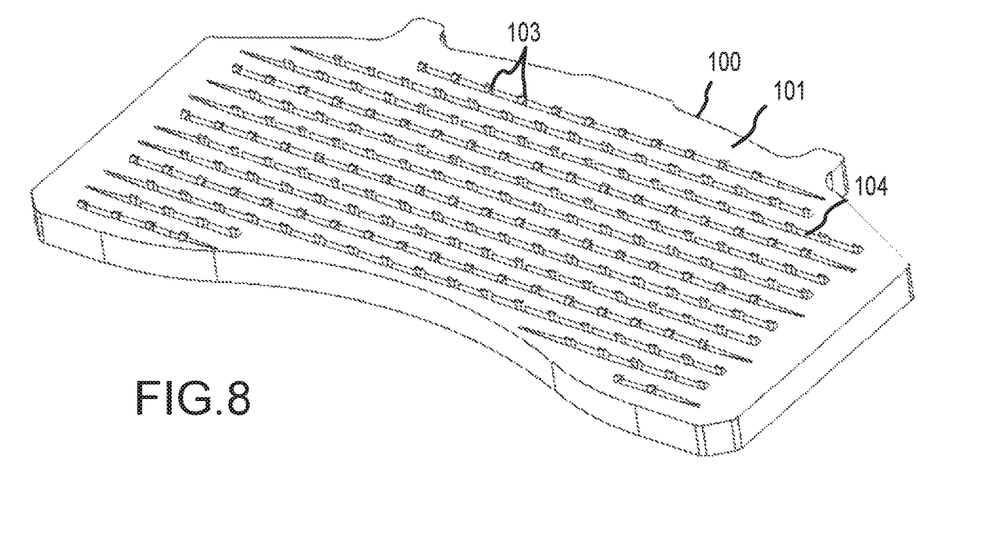
FIG. 8 is an isometric, perspective view of the retention plate of FIG. 5 after pressing.
Figure 9:
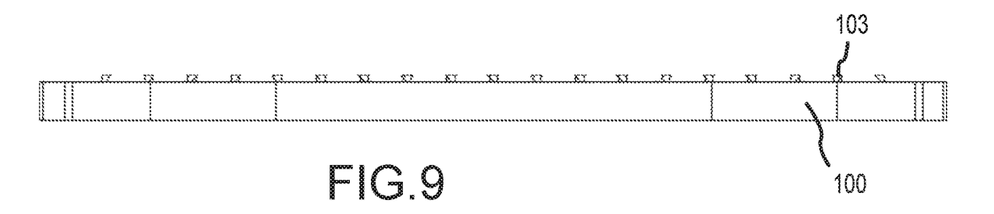
FIG. 9 is an isometric, front view of the retention plate of FIG. 8.
Figure 10:
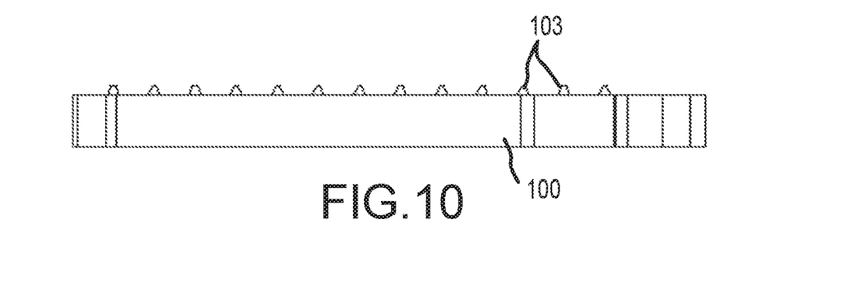
FIG. 10 is an isometric, side view of the retention plate of FIG. 8.
Figure 11:
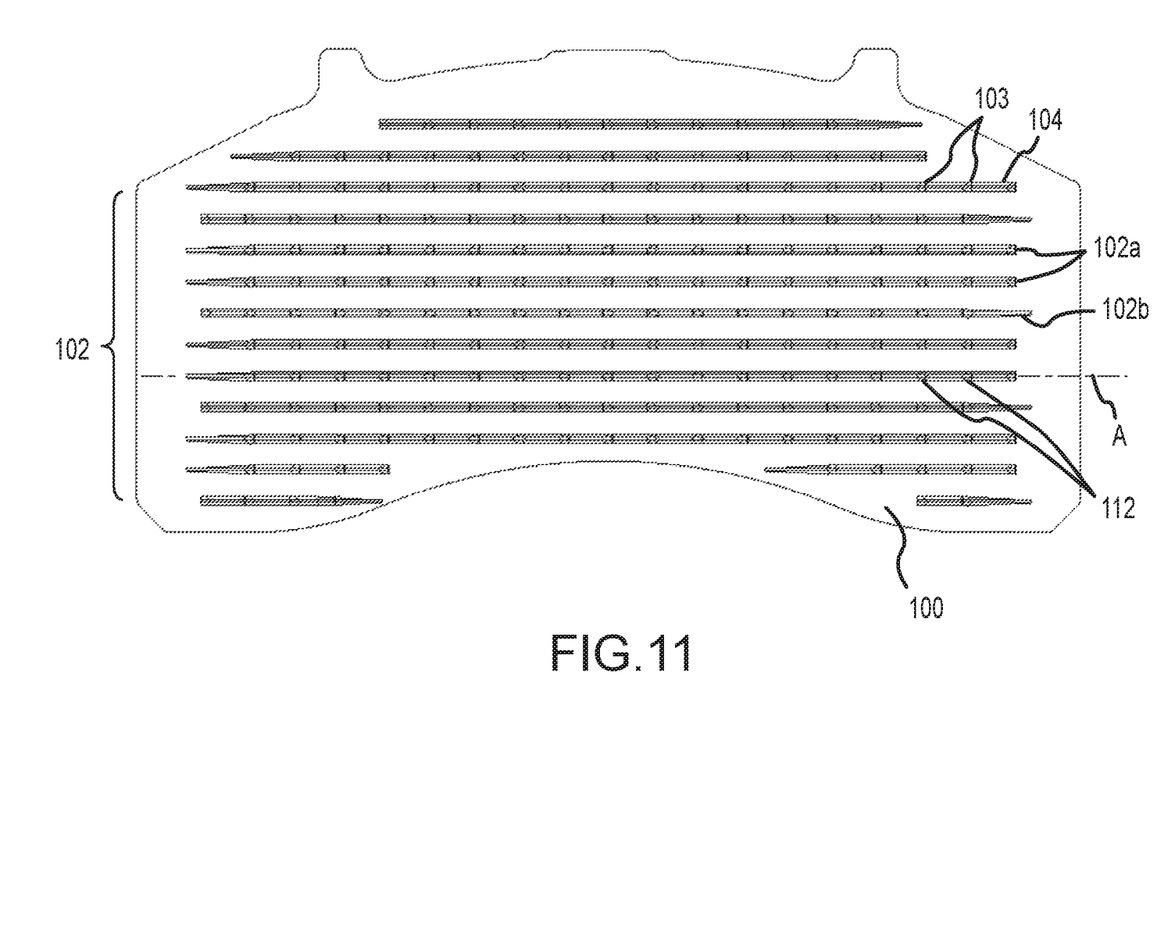
FIG. 11 is an isometric, top view of the retention plate of FIG. 8.

FIGS. 8, 9, 10, and 11 show view of the retention plate 100 after the tooth features 140 have been pressed to form the base portion 110 and mezzanine 112. FIG. 8 provides a perspective view of the retention plate 100 with the plurality of rows 102 having a plurality of retention features 101. Each of the retention features 101 includes a retention protrusion 103 and a gutter 104. FIG. 9 is a front elevation view and FIG. 10 is a side elevation view of the retention plate 100 showing the retention protrusions 103. FIG. 11 provides a top elevation view of the retention plate 100 having a plurality of rows 102. As best seen in FIG. 11, the gutters 104 generally have a central axis or longitudinal axis A. As designed, each of the retention protrusions 103 has a mezzanine 112 that extends over the gutter 104 at or proximal the central axis A. Of course, due to manufacturing tolerances, the mezzanine 112 may not be exactly at a central axis A.

Figure 12:
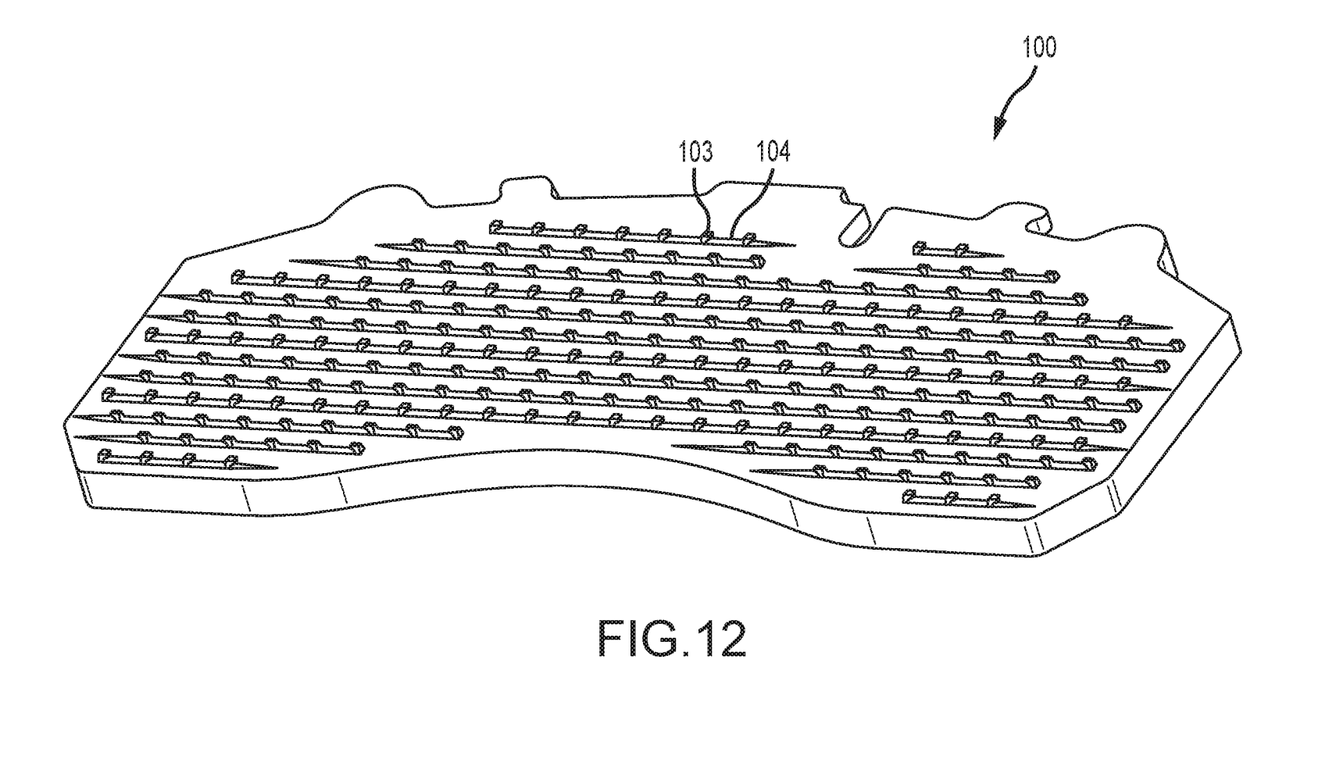
FIG. 12 is an isometric, perspective view of the retention plate consistent with the technology of the present application
Figure 13:
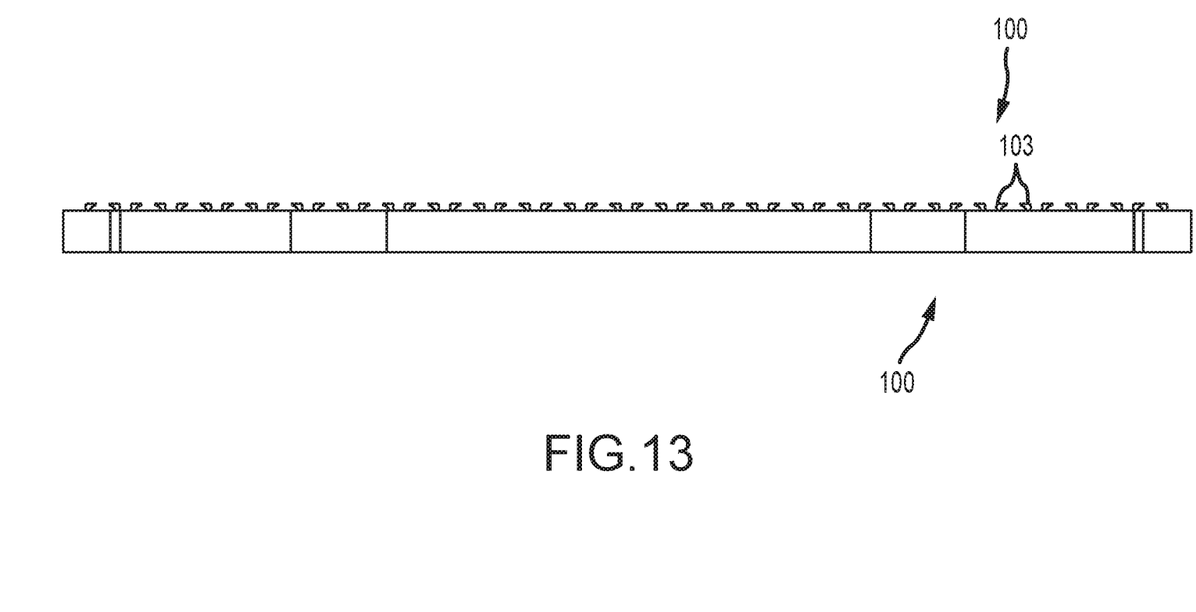
FIG. 13 is an isometric, front view of the retention plate of FIG. 12.
Figure 14:
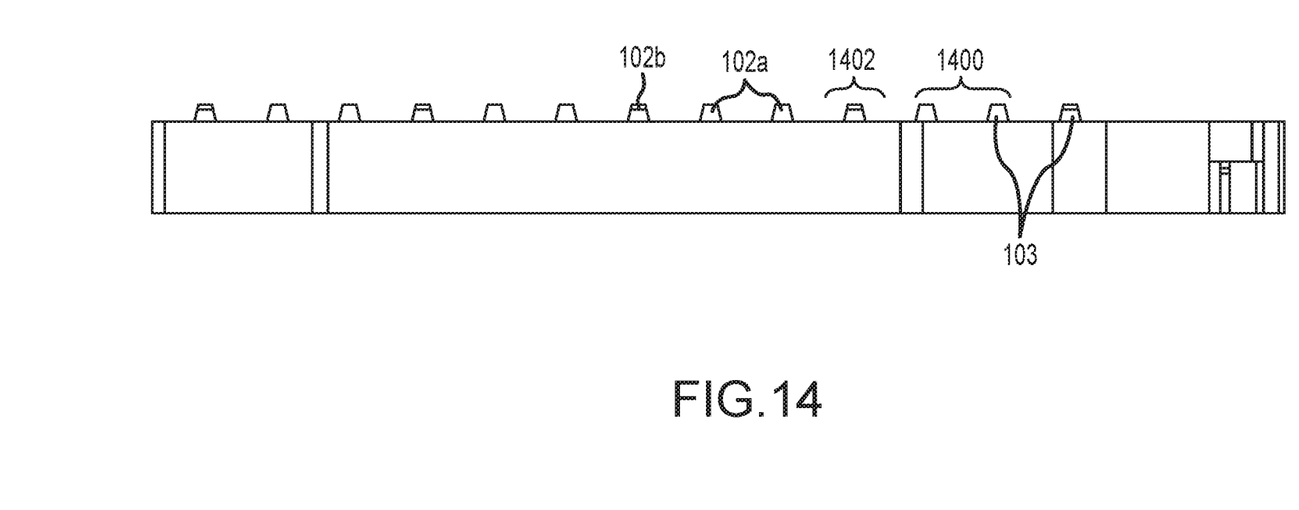
FIG. 14 is an isometric, side view of the retention plate of FIG. 12.

FIGS. 12, 13, and 14 show views of another retention plate 100 after the formation of the retention protrusions 103 along the gutters 104. With reference to FIG. 14, an elevation view of retention plate 100 providing a longitudinal of the plurality of rows is provided. As can be seen, a first set 1400 of rows 102a is formed with the retention protrusions 103 formed on a first side of the gutter. A second set 1402 of a single row 102b is formed with the retention protrusion 103 formed on the second side of the gutter.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

The invention claimed is:

1. A method of making retention features on a brake pad retention plate, comprising
   providing a blank plate, wherein the blank plate comprises a brake pad facing surface;
   forming, in the brake pad facing surface, a plurality of rows wherein each of the plurality of rows comprises a plurality of tooth features and a corresponding plurality of gutters where each gutter of the plurality of gutters comprises a first side and a second side, wherein the forming step comprises:
   upsetting a first set of the plurality of rows by forming each of the plurality of tooth features on the first side of the corresponding plurality of gutters, wherein the first set of the plurality of rows comprises at least two successive rows;
   upsetting a second set of the plurality of rows by forming each of the plurality of tooth features on the second side of the corresponding plurality of gutters, wherein the second set of the plurality of rows comprises a single row successive to the first set; and
   compressing each of the plurality of tooth features with a press wherein each of the tooth features bends at an inflection point to form an associated base portion extending vertically from an associated gutter and an associated mezzanine portion extending horizontally over the associated gutter, such that a capture chamber is formed between the associated mezzanine portion and the associated gutter and the capture chamber has an opening configured to allow material to enter the capture chamber.

2. The method of claim 1 further comprising upsetting a third set of the plurality of rows by forming each of the plurality of tooth features on the first side of the corresponding gutters, wherein the third set of the plurality of rows comprises at least two successive rows and the second set of the plurality of rows is located between the first set of the plurality of rows and the third set of the plurality of rows.

3. The method of claim 1 wherein each associated mezzanine portion is formed proximate to a longitudinal center line of each associated gutter.

4. The method of claim 1 wherein each of the corresponding plurality of gutters is formed with a length of no more than 7.5 mm.

5. The method of claim 4 wherein each associated mezzanine portion has a length of approximately ⅓ of the length of each associated gutter.

6. The method of claim 4 wherein each associated mezzanine portion has a length of approximately ¼ of the length of each associated gutter.

7. The method of claim 1 wherein each associated mezzanine portion has a length of no more than about 3 mm.

8. The method of claim 7 wherein each associated mezzanine portion has a length between 1.5 and 2.5 mm.

9. The method of claim 1 wherein each of the plurality of tooth features has a substantially straight gutter facing surface that forms an angle with a floor of each of the corresponding plurality of gutters.

10. The method of claim 9 wherein the angle is between 45 and 90 degrees.

11. The method of claim 1 wherein the step of compressing each of the plurality of tooth features with a press occurs prior to any application of a friction material to the brake pad retention plate.

12. A brake pad retention plate comprising
a brake pad facing surface;
at least a first set of rows of retention features wherein the first set of rows comprises at least two successive rows and wherein each of the retention features comprises an associated gutter having a first side and a second side and a retention protrusion formed on the first side of the associated gutter, wherein the retention protrusion comprises an associated base portion extending vertically from the associated gutter and an associated mezzanine portion extending horizontally above the associated gutter, the associated base portion and the associated mezzanine portion being separated by an associated bend; and
at least a single row of retention features successive to the first set of rows of retention features wherein each of the retention features comprises an associated gutter having a first side and a second side and a retention protrusion formed on the second side of the associated gutter, wherein the retention protrusion comprises an associated base portion extending vertically from the associated gutter and an associated mezzanine portion extending horizontally above the associated gutter, the base portion and the associated mezzanine portion being separated by a bend.

13. The brake pad retention plate of claim 12 wherein each gutter is no more than 7.5 mm in length.

14. The brake pad retention plate of claim 13 wherein each mezzanine portion is no more than 3 mm.

15. The brake pad retention plate of claim 13 wherein each mezzanine portion is between 1.0 mm and 2.5 mm.

16. The brake pad retention plate of claim 12 wherein each mezzanine portion is about ¼ to ⅓ the length of each gutter.

* * * * *